United States Patent Office 3,403,379
Patented Sept. 24, 1968

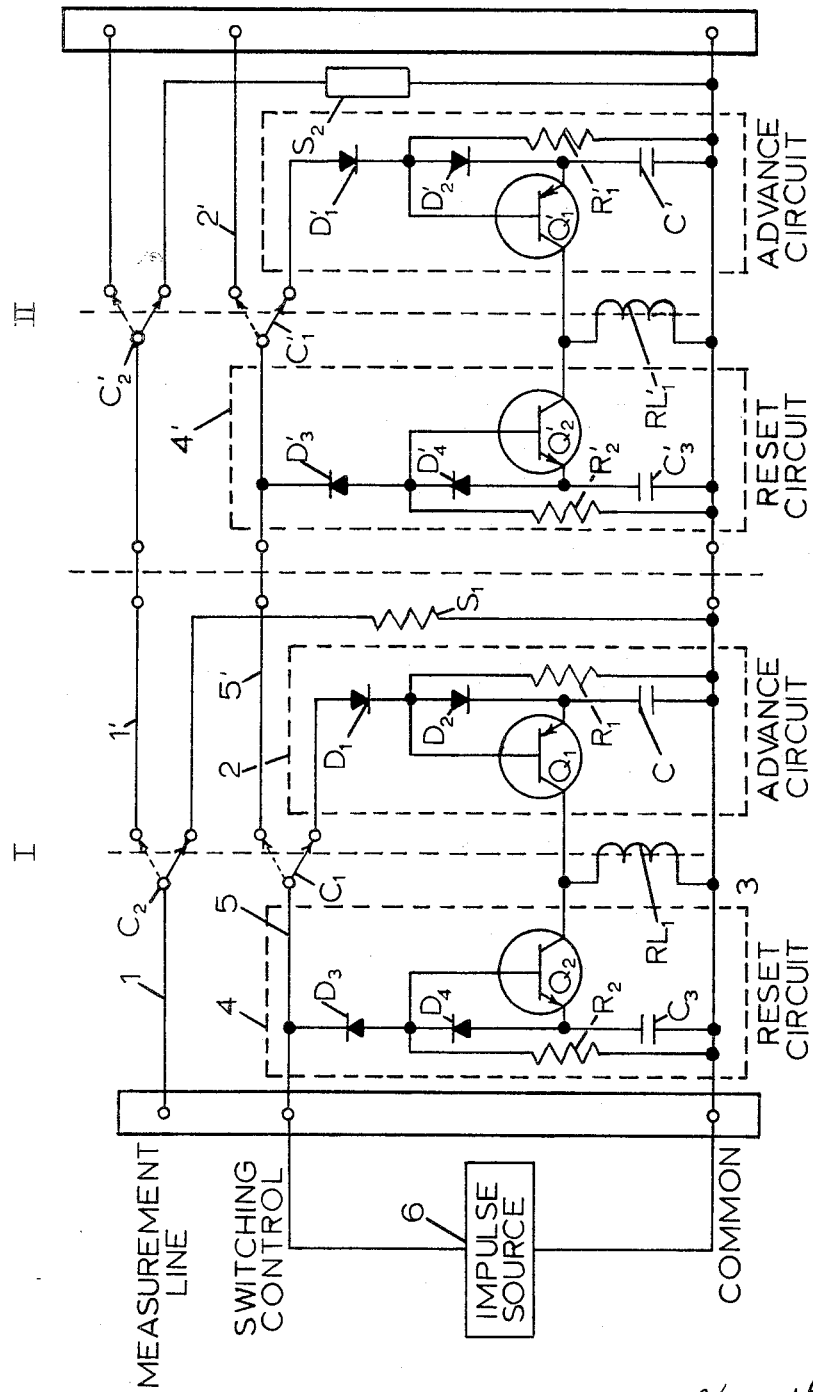

3,403,379
MEASUREMENT APPARATUS EMPLOYING
LONG-LINE CALL-UP SYSTEM
Kenneth E. Perry, Wayland, Mass., assignor, by mesne assignments, to EG & G International, Inc., Bedford, Mass., a corporation of Delaware
Filed May 27, 1965, Ser. No. 459,358
6 Claims. (Cl. 340—147)

The present invention relates to measurement apparatus and, more particularly, to long-line call-up systems in which a plurality of sensors is disposed at successively displaced regions along the line and the responses of the sensors are enabled to be measured successively through call-up circuitry.

In apparatus of the above-described character, there are applications wherein it is required that successive measurements be taken at a plurality of successively displaced regions along a common measurement line. One such application involves, for example, the measurement of temperature or other quantities at successively displaced regions along a measurement line disposed under the surface of the water, in order to obtain successive readings at different depths. While a plurality of measurement lines can be provided for this purpose and can be successively switched at the measuring location, this requires expensive and duplicative equipment and, in addition, does not provide for the use of a common measurement line for enabling comparable measurements to be made from each of a plurality of sensors. In prior-art efforts to provide a common measurement line, moreover, the application of voltages to any of the conductors of the line has inherently introduced spurious current and related effects along the line during the measurement periods.

An object of the invention, accordingly, is to provide a new and improved long-line measurement system that enables the use of a common two-conductor measurement line for a large number of successively displaced sensors, if desired, with provision for enabling successive connection to the successive sensors (i.e., call-up) without the necessity for any control voltages or other spurious currents being present along the measurement line during any measurement period.

A further object is to provide a novel and simplified system of this character that enables the conservation of equipment and eletcrical parts and, in addition, is particularly adapted for underwater and similar measurements.

Still a further object is to provide a novel measurement system of the character described in which, following the call-up or successive advancing measurement of a plurality of sensors, will enable simultaneous resetting of all of the advancing circuitry in a simplified and effective manner.

Other and further objects will be explained hereinafter and will be more particularly pointed out in connection with the appended claims.

The invention will now be described with reference to the accompanying drawing, the single figure of which is a schematic circuit diagram illustrating the invention as applied to a preferred embodiment thereof.

For purposes of illustration but two stages of measurement are illustrated at I and II in the drawing, though it is to be understood that a large number of such stages may be employed as, for example, in the underwater applications previously discussed. The first stage I is shown comprising a first sensor $S_1$, in this case illustrated as a precision reference resistor for enabling appropriate calibration measurement along a two-conductor measurement line comprising conductors 1 and 3. The term "sensor" or "sensing means" as used herein, is intended to connote any device the electrical parameters of which are to be measured, such as a thermistor in the case of temperature, or the before-mentioned precision reference resistor, or any other two-terminal transducer device, as examples. The stage I comprises an advance circuit 2, a reset circuit 4 and a switching circuit, illustrated as a magnetic latch relay $RL_1$ with armature-control switching members or contactors $C_1$ and $C_2$.

Similarly, the second or next successive stage II comprises a sensor $S_2$ which is disposed at a region displaced along the line 1–3 from the sensor $S_1$ and, in this case, for purposes of illustration, is shown as a thermistor for measuring the temperature at the location thereof. The stage II, like stage I, embodies an advance circuit $2'$, a reset circuit $4'$ and a switching circuit comprising a relay $RL_1'$ with its associated armature-controlled switching members $C_1'$ and $C_2'$. Further stages, if employed, may be similarly constructed.

For the solid-line position of the switch members $C_1$ and $C_2$ of stage I, the measurement line 1 is effectively connected through the switch $C_2$ to the upper terminal of the sensor $S_1$, the opposite terminal of which is permanently connected to the other conductor 3 of the measurement line 1–3. Thus, a measurement of the sensor element $S_1$ may be readily effected without any spurious voltages or current present in the two-conductor measurement line 1–3. After the measurement is completed, an impulse, in this case a positive pulse from a source 6, may be applied by way of a further conductor 5, through switch $C_1$, to a pair of series-connected diodes $D_1$ and $D_2$, appropriately poled to enable charging of an energy-storage capacitor C during the application of the impulse from the source 6. The capacitor C is connected to the conductor 3 that serves as a common conductor between the measurement line 1–3 and the feed from the impulse source 6.

The capacitor C may, for example, be charged to about 22 volts by a 24-volt positive pulse supplied at 5–3, the forward drop across diode $D_2$ causing the base-emitter relative potentials of a transistor relay $Q_1$ (connected with its base and emitter shunting the diode $D_2$) to keep the transistor reversely biased such that it is normally ineffective or cut off. When the positive pulse terminates, however, the diodes $D_1$ and $D_2$ become reversedly biased and capacitor C retains its charge momentarily at the before-mentioned 22 volts. A resistor $R_1$ shunting diode $D_2$ and capacitor C will cause the voltage on the base of transistor $Q_1$ to drop, rendering that transistor relay $Q_1$ effective or conductive. The collector thereof will saturate, applying approximately 21 volts (in the above illustration) to the coil of the latch relay $RL_1$. The charged capacitor C will thereupon discharge through that relay coil, causing the switch members $C_1$ and $C_2$ to move upward into the dotted-line positions.

It will be observed that the measurement line 1 is then connected through the dotted-line position of switch $C_2$ and a line extension $1'$ to and through the switch $C_2'$ of stage II, and to the upper terminal of the sensor $S_2$ of that second stage. The lower terminal of sensor $S_2$ is permanently connected to the common conductor 3 of the measurement line. Thus, a measurement may now be taken of the response of the sensing element $S_2$ at the displaced location thereof along the common measurement line 1–3, again without any voltages or other spurious effects existing along that line. The switch $C_1$ of stage I, however, in its dotted-line position, now connects the impulse source 6 by way of conductor 5 and extension $5'$ through the switch element $C_1'$ of the second stage II to the advance circuit $2'$ of the stage II. This advance circuit $2'$ is constructed similarly to the circuit 2, above described, and similar elements therein are given the same reference numerals but with a prime notation.

Following an understood measurement of the sensing element $S_2$, a second or further impulse from the source 6 will now be applied, such as a positive pulse as before discussed, to effect the rendering conductive of the transistor $Q_1'$ of advance circuit 2', following charging of capacitor C'. This will energize the relay coil $RL_1'$ and cause the corresponding switches $C_1'$ and $C_2'$ controlled thereby to move upward to their dotted-line positions, and thus to enable similar connections to be effected to a succeeding stage, not shown. Thus, successive call-ups have been effected at the stages I and II (and any subsequent stages) to enable the successive measurements of successively displaced sensing elements and the automatic switching or advancing along the line to further sensing elements.

When the desired sequence of measurements has been completed, it will be observed that the switching elements $C_1$ and $C_2$ of stage I, $C_1'$ and $C_2'$ of stage II, etc., will be in their upward dotted-line positions, a plurality of now-to-be-described reset circuits 4 and 4' connected to common conductor 5 and common conductor 3. Since each of the reset circuits is of similar character, it will suffice to describe the reset circuit 4 embodying series-connected diodes $D_3$ and $D_4$, reversely poled with respect to the diodes $D_1$ and $D_2$ of the advance circuits so that they do not pass the positive pulse that operated the successive advance circuits 2, 2', etc. The reset circuit 4 also includes an energy storage element $C_3$ and a normally ineffective or non-conductive transistor $Q_2$, the base and emitter of which are connected across the diode $D_4$, with the diode $D_4$ and capacitor $C_3$ being shunted by a resistor $R_2$ for the same purposes discussed in connection with the operation of the advance circuit. Thus, after the application of a negative or opposite-polarity impulse from source 6 simultaneously to each of the reset circuits 4, 4', etc., and charging of capacitors $C_3$, $C_3'$, etc., the corresponding transistors $Q_2$, $Q_2'$, etc., will be rendered conductive and will send opposite current through the latched relay coils $RL_1$, $RL_1'$, etc., to cause the switch or contactor elements thereof to assume the solid-line positions illustrated in the drawing. This operation will be effected substantially simultaneously in all stages.

The system is now in condition for the next sequential call-up operations for enabling subsequent successive measurements at the successively displaced sensing elements along the line.

While the measurement line is shown comprising the two conductors 1 and 3, and a separate switch control line 5 sharing the common coductor 3, this is for purposes of convenience. It is also possible to combine the functions of the measurement line 1 and the switch control line 5 in a single line to which potential will be applied during the period of switching and removed during the period of measurement. Such operation, however, does have the disadvantage of applying voltage across the sensing element, which is in many cases an undesirable factor. In addition, in such operation, the switching diodes, transistors and other circuitry will effectively shunt the measurement line, producing parasitic and other spurious effects that are not in all cases desirable.

It is to be understood, of course, that other switching devices than relays and transistors and other types of diodes, energy-storing elements and equivalent elements than the particular types illustrated may, if desired, also be employed. Further modifications will also occur to those skilled in the art and all such are considered to fall within the spirit and scope of the invention as defined in the appended claims.

What is claimed is:

1. Apparatus for making measurements at a plurality of successively displaced regions having, in combination, a two-conductor line; a plurality of sensing means disposed at successive displaced regions along the line and permanently connected with at least one conductor of the line; a corresponding plurality of similar advance circuits each provided with energy storage means and normally ineffective relay means; a source of successive electrical impulses; a corresponding plurality of switching means for connecting the other conductor of the line to a first of the plurality of sensing means to enable a measurement thereof through the line and for connecting the source to a first of the advance circuits in order to enable a first impulse from the said source to energize the energy storage means thereof and, upon termination of the impulse, to render the corresponding relay means thereof effective; means responsive to the effective relay means of the said first advance circuit for controlling the corresponding first switching means to disconnect the said first sensing means from the said other conductor and to connect a second of the plurality of sensing means at a displaced region along the line to the said other conductor to enable a measurement thereof through the line while connecting the corresponding second advance circuit to the said source.

2. Apparatus as claimed in claim 1 and in which there is provided a corresponding plurality of reset circuits connected between the said one conductor and the said source after the rendering effective of the corresponding advance circuit, and means for applying a further impulse to all of the reset circuits from the source to reset the switching means.

3. Apparatus as claimed in claim 1 and in which the switching means comprises a relay-controlled two-pole switch, one for connecting the said source successively to successive advance circuits and the other for connecting the successive sensing means successively to the said other conductor of the line.

4. Apparatus as claimed in claim 1 and in which each advance circuit comprises appropriate poled diode means in circuit with the energy storage means to energize the same during an impulse of one polarity from the source, and the said advance circuit relay means comprises a normally non-conductive transistor that becomes rendered conductive from the energized storage means to operate the corresponding switching means.

5. Apparatus as claimed in claim 4 and in which there is provided a corresponding plurality of similar reset circuits each provided with diode means poled opposite to the first-named diode means and in circuit with further energy storage means to energize the same during an impulse from the source of opposite polarity to the said one polarity, each reset circuit having a normally non-conductive transistor connected with its energy storage means that becomes rendered conductive from the energized storage means to reset the corresponding switching means.

6. Apparatus as claimed in claim 4 and in which the said switching means comprises contactor means operated by latch relay means controlled by the rendering conductive of the said transistor of the corresponding advance circuit.

References Cited

UNITED STATES PATENTS

| 3,083,306 | 3/1963 | Lindstrom et al. | 307—223 |
| 3,355,577 | 11/1967 | Heuer | 340—168 XR |
| 3,368,200 | 2/1968 | McNicol | 340—147 |

JOHN W. CALDWELL, *Primary Examiner.*

D. J. YUSKO, *Assistant Examiner.*